(12) United States Patent
Ooyabu

(10) Patent No.: US 7,418,330 B2
(45) Date of Patent: Aug. 26, 2008

(54) ELECTRONIC CONTROL UNIT AND SYSTEM FOR CONTROLLING DUAL-STAGE OCCUPANT RESTRAINT SYSTEM

(75) Inventor: Shinji Ooyabu, Anjo (JP)

(73) Assignee: DENSO CORPORATION, Kariya (JP)

( * ) Notice: Subject to any disclaimer, the term of this patent is extended or adjusted under 35 U.S.C. 154(b) by 73 days.

(21) Appl. No.: 11/159,272

(22) Filed: Jun. 23, 2005

(65) Prior Publication Data
US 2006/0000948 A1    Jan. 5, 2006

(30) Foreign Application Priority Data
Jun. 30, 2004    (JP) .............................. 2004-193125

(51) Int. Cl.
*B64D 25/115*    (2006.01)
*B60R 21/01*    (2006.01)

(52) U.S. Cl. ...................... 701/45; 280/735; 280/728.1; 280/734; 280/802; 307/10.6

(58) Field of Classification Search .................. 701/45; 280/735, 728.1, 734, 802; 307/10.6; 315/227 R; 247/341, 357; *B64D 25/115; B60R 21/01*
See application file for complete search history.

(56) References Cited

U.S. PATENT DOCUMENTS

| | | | |
|---|---|---|---|
| 5,027,040 A * | 6/1991 | Ikeda et al. ............. 315/241 R |
| 5,187,465 A | 2/1993 | Stonerook et al. | |
| 6,549,836 B1 * | 4/2003 | Yeh et al. ...................... 701/45 |
| 6,652,001 B2 * | 11/2003 | Furui ......................... 280/735 |
| 6,744,820 B1 | 6/2004 | Khairallah et al. | |
| 6,791,207 B2 * | 9/2004 | Yoshida et al. ............. 307/10.1 |
| 7,142,965 B2 * | 11/2006 | Metzger et al. ................ 701/45 |
| 2001/0054846 A1 * | 12/2001 | Boezen et al. ............. 307/10.1 |
| 2003/0038464 A1 * | 2/2003 | Furui ......................... 280/735 |
| 2004/0108698 A1 * | 6/2004 | Rothleitner ................. 280/735 |

* cited by examiner

*Primary Examiner*—Tuan C To
(74) *Attorney, Agent, or Firm*—Posz Law Group, PLC

(57) ABSTRACT

In a control system for a dual-stage airbag firing system, a series circuit of first and second switching elements and a series circuit of third and fourth switching elements are connected in parallel between high and low voltage power lines, the circuit node between the switching elements of each series circuit being connected to a corresponding one of a pair of output terminals. When an impact is received, the first and fourth switching elements are exclusively activated to generate a forward voltage across the output terminals, causing a forward current to flow in the firing system so that its first stage is exclusively fired. Subsequently, the third and second switching elements are exclusively activated to generate a reverse voltage across the output terminals in a direction opposite to the forward voltage, causing a reverse current to flow in the firing system so that its second stage is fired.

20 Claims, 9 Drawing Sheets

ELECTRONIC CONTROL UNIT AND SYSTEM FOR CONTROLLING DUAL-STAGE OCCUPANT RESTRAINT SYSTEM

CROSS-REFERENCE TO RELATED APPLICATION

This application is related to Japanese Patent Application No. 2004-193125 filed on Jun. 30, 2004, the contents of which is hereby incorporated by reference.

BACKGROUND OF THE INVENTION

1. Field of the Invention

The present invention relates to an electronic control unit and a system for the protection of vehicle occupants using a restraint system including a dual-stage airbag and/or seat belt pretensioner having both driver and passenger side firing circuits.

2. Description of the Related Art

U.S. Pat. No. 5,187,465 discloses a dual airbag restraint system having two firing circuits for independently operating a driver-side squib and a passenger-side squib.

Also known is a dual-stage airbag restraint system in which a single airbag is deployed in stages, initially on a driver side and subsequently on a passenger side. As illustrated in FIG. 9, the prior art dual-stage airbag control system is comprised of an electronic control unit 101 and a dual-stage firing module 102. ECU 101 has a first pair of transistors 104 and 105 having their source-drain paths connected in a first series circuit between the high and low voltage terminals of a DC voltage source 103 and a second pair of transistors 106 and 107 having their source-drain paths connected in a second series circuit between the high and low voltage terminals. In the first series circuit the squib 112 of the first-stage firing circuit is connected. In the second series circuit the squib 113 of the second-stage firing circuit is connected. All transistors are controlled by gate control signals supplied from a switching controller 120. Switching controller 120 receives an input voltage representing the impact on the passenger vehicle. When the input voltage exceeds a critical level, the switching controller 120 causes the transistors 104 and 105 to turn ON to fire the squib 112 so that the airbag is deployed on its driver side. Subsequently, the switching controller 120 enables the transistors 106 and 107 to turn ON, causing the squib 113 to deploy the airbag on its passenger side. However, two connector pins 108, 109 are required for activating the first firing circuit 112 and two connector pins 110, 111 are further required for activating the second firing circuit 113. Since it is desired that the number of channels for connecting the dual-stage firing module 102 to the ECU 101 be as small as possible to simplify the vehicle's harness, the prior art system is not satisfactory from the manufacturing viewpoint.

U.S. Pat. No. 6,744,820 discloses a communication system for connecting a master unit to slave units of an occupant protection system using frame messages asynchronously multiplexed on a pair of communication lines. Electrical energy and messages are transmitted from the master unit to a number of slave units by modulating the voltage of the electrical energy. Although the number of channels can be reduced, the components of the system are complex and expensive.

SUMMARY OF THE INVENTION

It is therefore an object of the present invention to provide an electronic control unit having a small number of channels for controlling a dual-stage firing system.

Another object of the present invention is to provide a control system having a small number of channels and simplified components for a dual-stage occupant restraint system.

In general terms, the present invention provides an electronic control unit for controlling a dual-stage firing system of a vehicle occupant restraint system. The electronic control unit comprises first and second output terminals adapted for connection to the dual-stage firing system, and current supply circuitry for initially supplying a forward current to a first stage of the dual-stage firing system through the first and second output terminals when an impact is received, and subsequently supplying a reverse current to a second stage of the dual-stage firing system through the first and second output terminals in a direction opposite to the forward current.

According to a specific aspect of the present invention, the current supply circuit comprises a first series circuit of first and second switching elements connected between high and low voltage power lines to form a first circuit node between the first and second switching elements, and a second series circuit of third and fourth switching elements connected between the high and low voltage power lines in parallel with the first series circuit to form a second circuit node between the third and fourth switching elements. The first and second circuit nodes are connected to the first and second output terminals respectively. Control circuitry exclusively activates the first and fourth switching elements when an impact is received for generating a forward voltage across the first and second output terminals, and subsequently exclusively activates the third and second switching elements for generating a reverse voltage across the first and second output terminals in a direction opposite to the forward voltage.

According to another aspect, the present invention provides a dual-stage firing system for a vehicle occupant restraint system. The dual-stage firing system comprises a DC voltage source, first and second output terminals, and current supply circuitry for supplying a forward current from the DC voltage source in a direction from the first output terminal toward the second output terminal when an impact is received, and subsequently supplying a reverse current from the voltage source in a direction from the second output terminal toward the first output terminal. A first firing circuit including a first firing element is connected across the first and second output terminals for activating the first firing element in response to the forward current, and a second firing circuit including a second firing element is connected across the first and second output terminals for activating the second firing element in response to the reverse current.

According to a further aspect of the present invention, there is provided a method of controlling a dual-stage firing system of a vehicle occupant restraint system, comprising the steps of generating a forward voltage across first and second terminals when an impact is received, generating a forward current in a first firing element of the dual-state firing system in response to the forward voltage, generating a reverse voltage opposite in polarity to the forward voltage across the first and second terminals, and generating a reverse current in a second firing element of the dual-stage firing system in response to the reverse voltage.

BRIEF DESCRIPTION OF THE DRAWINGS

The present invention will be described in detail with reference to the following drawings, in which.

DETAILED DESCRIPTION

Figure 1:
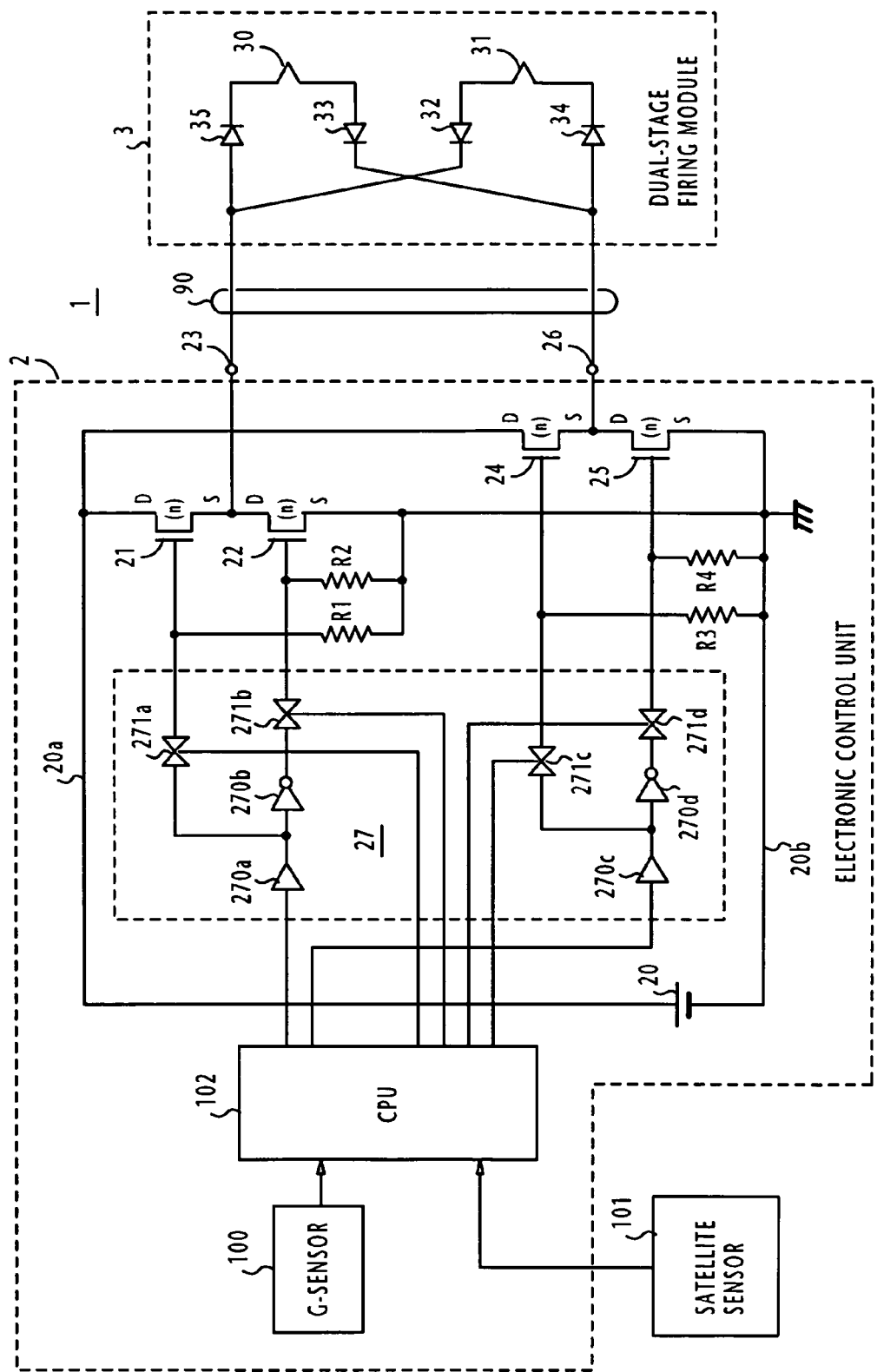
FIG. 1 is a block diagram of a control system for a dual-stage occupant restraint system according to a first embodiment of the present invention.

In FIG. 1, there is shown a control system for a dual-stage vehicle occupant restraint system according to one embodiment of the present invention. The control system, generally designated as 1, includes an electronic control unit 2 and a dual-stage firing module 3. ECU 2 is mounted on the instrument panel of a passenger vehicle and the firing module 3 is mounted on the midpoint of the steering wheel. Although not shown, an inflator and an airbag system are folded into the steering wheel.

The number of channels between the ECU 2 and the dual-stage firing module 3 is reduced and advance is made over the prior art by initially supplying a forward current from the ECU 2 to the firing module 3 to activate the first stage of the module 3 and then supplying a reverse current to the firing module 3 to activate its second stage. The first and second stages of firing mode 3 respectively include squids 30 and 31.

Electronic control unit 2 includes an impact sensor known as G-sensor 100 to generate a signal representing an impact on the vehicle and a CPU (central processing unit) 102, which receives the output of G-sensor 100 and a signal from at least one external impact sensor, such as a satellite sensor 101. As described in detail below, when these signals reach a predetermined voltage level, the CPU 102 produces switching control signals such that the ECU 2 initially operates the first stage and then the second stage to successively fire their squibs 30 and 31. When the squib 30 is initially heated, it ignites the inflator to deploy the airbag on its driver side. When the squib 31 is subsequently heated, it further ignites the inflator to deploy the airbag on its passenger side.

ECU 2 includes a battery 20 providing a DC power voltage to a high-voltage power line 20a and a low-voltage power line 20b, which is grounded. A first series circuit of an n-channel MOSFET (metal-oxide-semiconductor field-effect transistor) 21 and an n-channel MOSFET 22 is connected between the high power voltage line 20a and the low power voltage line 20b. A second series circuit of an n-channel MOSFET 24 and an n-channel MOSFET 25 is connected between the high power voltage line 20a and the low power voltage line 20b. A circuit node between the MOSFETs 21 and 22 is connected to a first output terminal 23 of the ECU 2 and a circuit node between the MOSFETs 24 and 25 is connected to a second output terminal 26 of the ECU 2.

The gate electrodes of MOSFETs 21 and 22 are respectively connected by pull-down resistors R1 and R2 to ground, and the gate electrodes of MOSFETs 24 and 25 are respectively connected by pull-down resistors R3 and R4 to ground. With these pull-down resistors, all MOSFETs 21, 22, 24, 25 are normally biased into an OFF state.

As described later, the MOSFETs 21 and 25 are the first and fourth switching elements of the ECU 2, respectively, and these switching elements are initially turned ON exclusively. MOSFETs 24 and 22 are the third and second switching elements, respectively. These switching elements are subsequently turned ON.

ECU 2 is provided with a switching circuit 27, which includes a first series of a buffer 270a and an inverter (i.e., NOT gate) 270b. The outputs of buffer 270a and inverter 270b are connected through analog switches 271a and 271b, respectively, to the gate electrodes of MOSFETs 21 and 22. Further, the switching control circuit 27 includes a second series of a buffer 270c and an inverter 270d, the outputs of buffer 270c and inverter 270d being connected through analog switches 271c and 271d, respectively, to the gate electrodes of MOSFETs 24 and 25. Control signals are supplied from the CPU 102 to the switching circuit 27.

In the dual-stage firing module 3, the squib 30 in the first-stage firing circuit is connected between the cathode of a diode 33 and the anode of a diode 35, the anode of diode 35 and the cathode of diode 33 being respectively connected to the output terminals 23 and 26 of the ECU 2 through a harness 90. Squib 31 in the second firing circuit is connected between the cathode of a diode 34 and the anode of a diode 32, with the anode of diode 34 and the cathode of diode 32 being respectively connected to the output terminals 26 and 23 through the harness 90.

As will be described, the output terminal 23 is initially driven to a high voltage with respect to the output terminal 26, causing a current to flow through diodes 35 and 33, the squib 30 is fired. Output terminal 26 is subsequently driven to a high voltage with respect to the output terminal 23 to cause a current to flow through the diodes 34 and 32, the squib 31 is fired.

When the output terminal 26 is subsequently driven to a high voltage level, the diode 33 is reverse-biased with respect to the output terminal 26 and advantageously prevents the high voltage from being applied to the squib 30 which may be broken and may come into contact with the vehicle body if the diode 33 is not otherwise provided.

The operation of the control system of FIG. 1 will be described below with reference to FIGS. 2A and 2B.

Figure 2A:
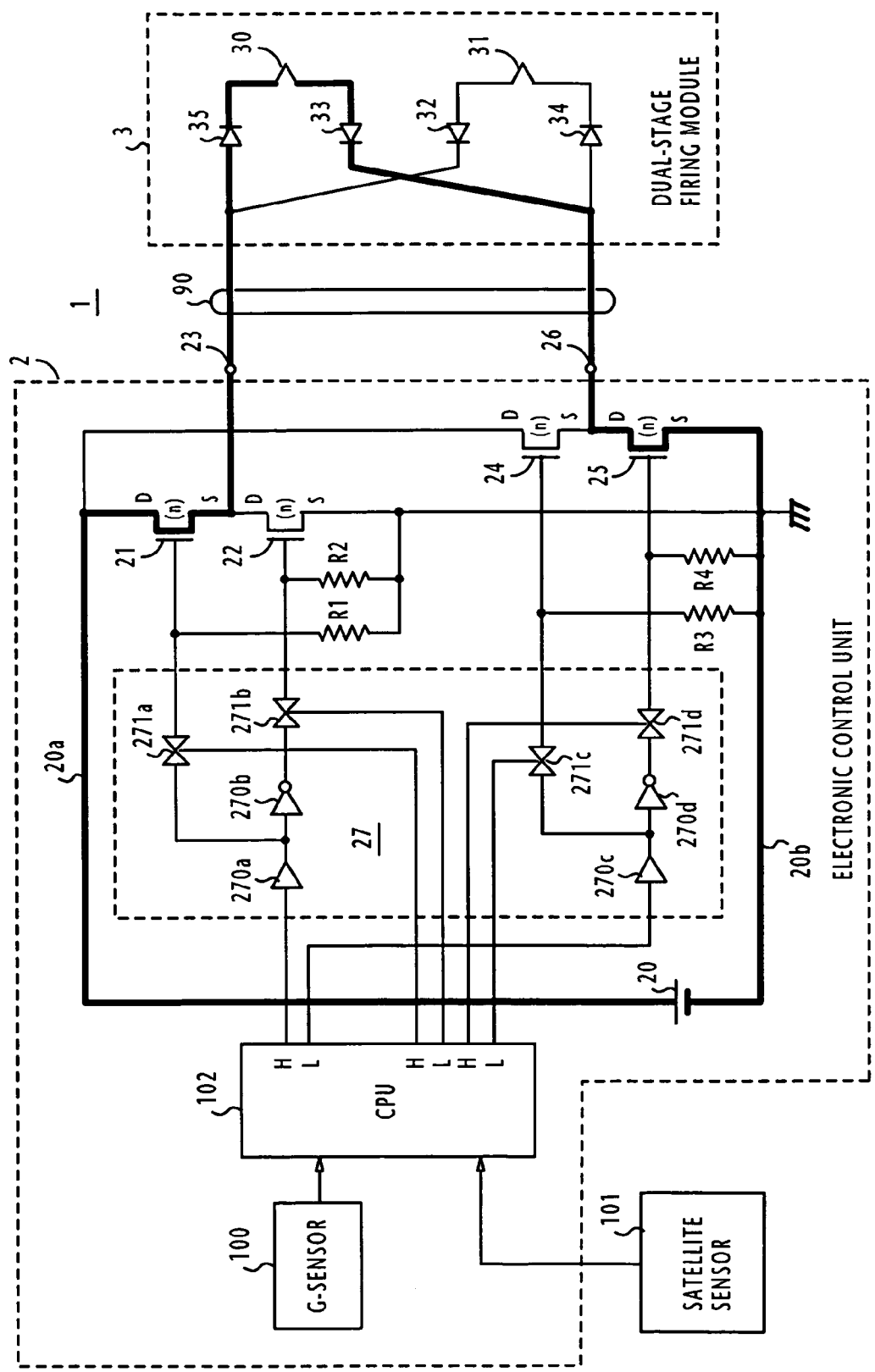
FIG. 2A is a block diagram of the first embodiment showing the flow of current from an ECU to a dual-stage firing module when the first-stage firing circuit is activated.
Figure 2B:
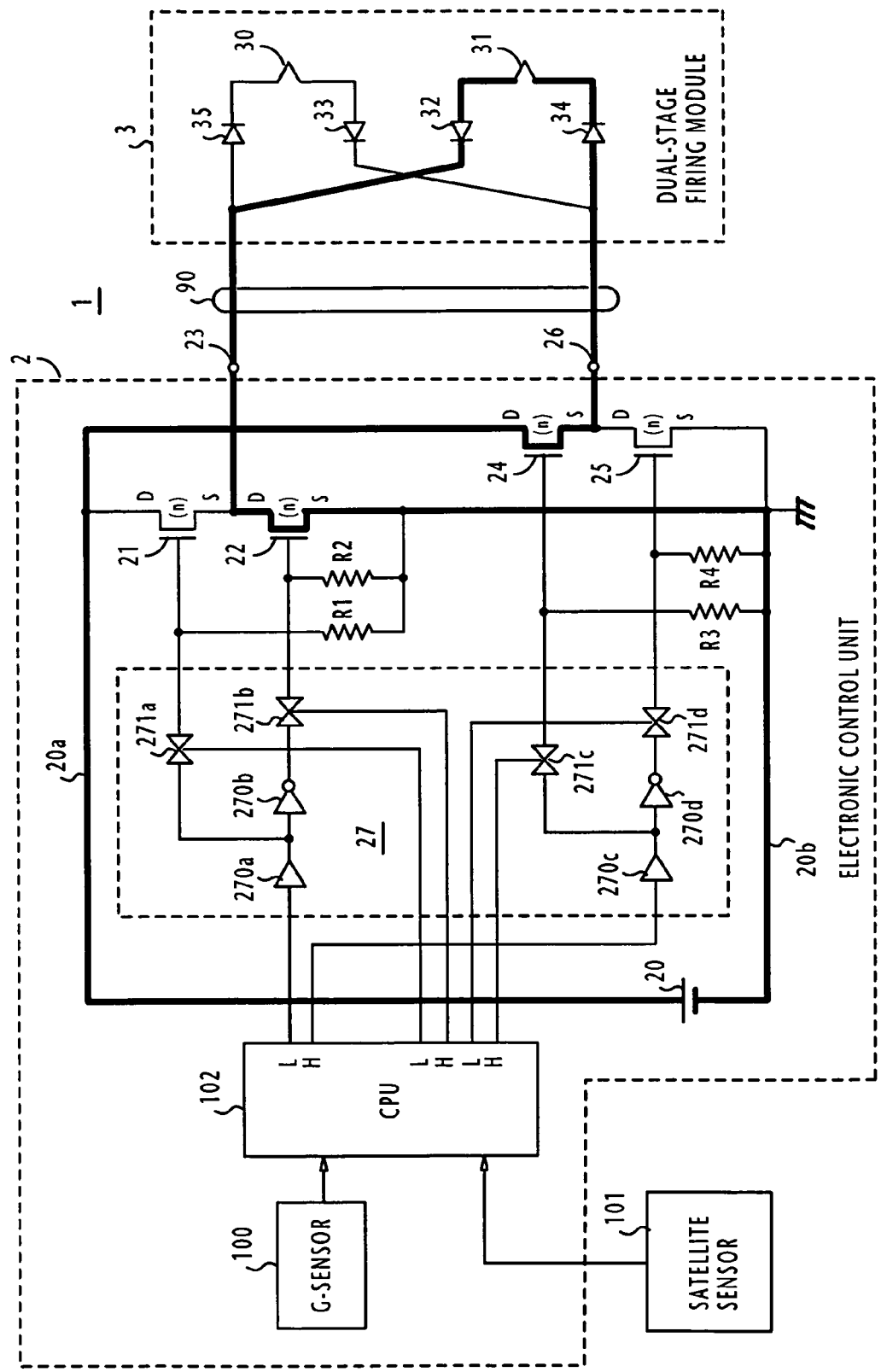
FIG. 2B is a block diagram of the first embodiment showing the flow of current when the second-stage firing circuit is activated.

In FIG. 2A, when the output of G-sensor 100 or satellite sensor 101 exceeds a critical level in response to the vehicle body being impacted, the CPU 102 drives the buffer 270a with a high voltage (H) and drives the buffer 270c with a low voltage (L), producing bias voltages at the outputs of buffer 270a and inverter 270d, and sets the analog switches 271a and 271d into an ON state, while setting the other analog switches in an OFF state. Thus, the bias voltage at the output of buffer 270a is coupled through the analog switch 271a to the gate of MOSFET 21 and the bias voltage at the output of inverter 270d is coupled through the analog switch 271d to the gate of MOSFET 25. MOSFETs 21 and 25 are switched to an ON state, and a high power voltage appears at the output terminal 23 with respect to the output terminal 26, causing a current to flow through the squib 30 as indicated by a thick line. Squib 30 is fired to operate the inflator.

At a specified interval following the firing of squib 30 (FIG. 2B), the CPU 102 drives the buffer 270a with a low voltage (L) and drives the buffer 270c with a high voltage (H), producing bias voltages at the outputs of inverter 270b and buffer 270c, and sets the analog switches 271b and 271c into an ON state, while setting the other analog switches into an OFF state. Thus, the bias voltage at the output of inverter 270b is coupled through the analog switch 271b to the gate of MOSFET 22 and the bias voltage at the output of buffer 270c is coupled through the analog switch 271c to the gate of MOSFET 24. MOSFETs 22 and 24 are turned ON, and a high power voltage appears at the output terminal 26 with respect to the output terminal 23, causing a current to flow through the squib 31 as indicated by a thick line. Squib 31 is fired to further operate the inflator.

As a result, the airbag is deployed in successive stages for the protection of a driver and a passenger.

When the squib 30 is fired, there is likelihood that this squib may be broken and come into contact with the vehicle body. When a high power voltage subsequently appears at the output terminal 26 for firing the squib 31, the diode 33 is reverse-biased. Due to the provision of the reverse-biased diode 33, the broken squib 30 and hence the vehicle body are advantageously isolated from this high power voltage.

When a control system 1 is manufactured and diagnosed to verify its operation, a small current is generated that flows through the squibs 30 and 31. A voltage difference is then measured across each of the squibs 30, 31 as an indication of the quality of the product. If the diodes provided for each squib have a high forward resistance, they will produce a high voltage drop. This high voltage drop may account for a measurement error. To minimize this error, it is preferable to use a Schottky diode for each of the diodes 32 through 35.

Figure 3:
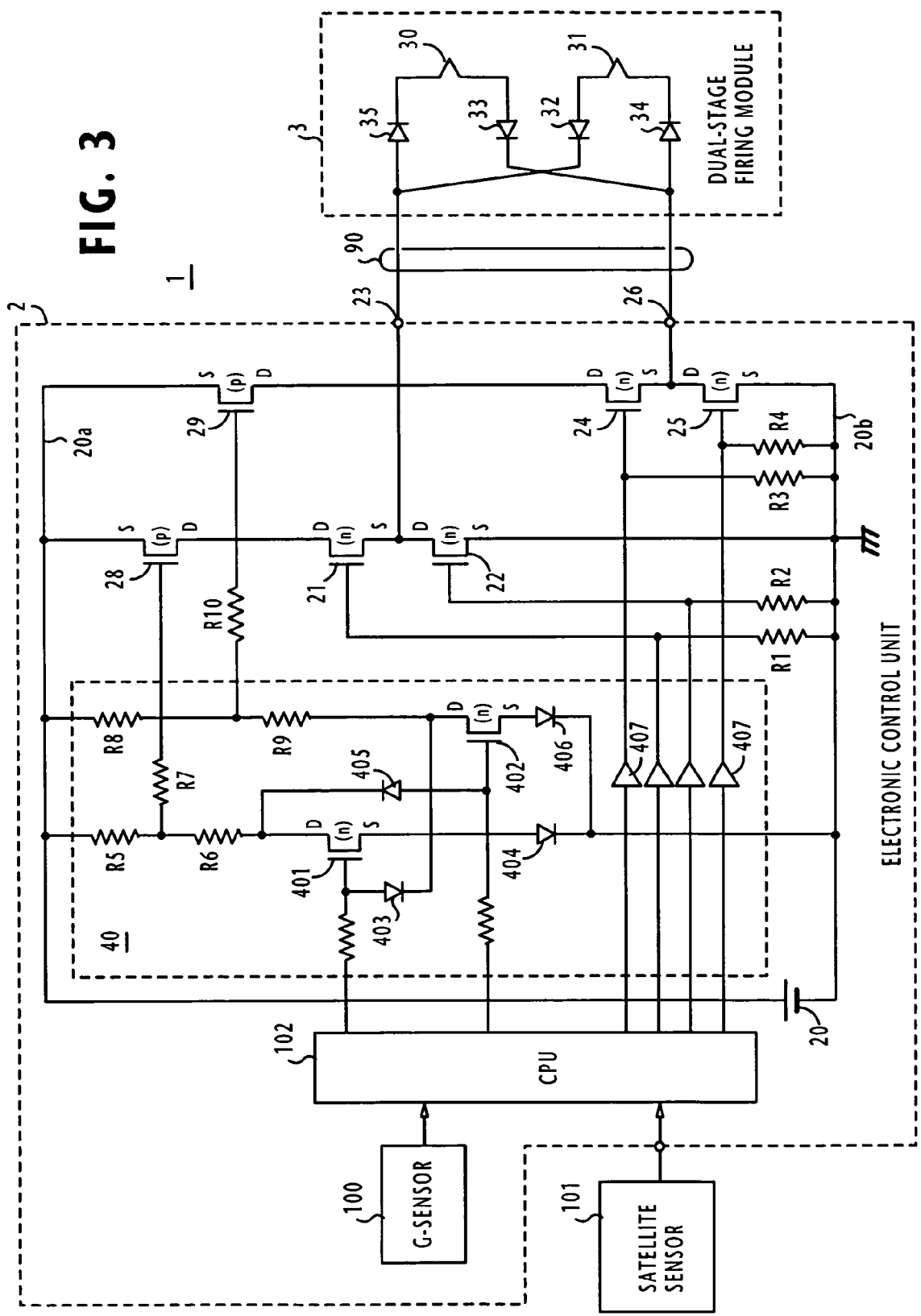
FIG. 3 is a block diagram of the control system according to a second embodiment of the present invention.

The switching circuit 27 of the previous embodiment can be modified as shown in FIG. 3. In this modification, P-channel MOSFETs 28 and 29 are provided. MOSFET 28 has its source-drain path connected between the power line 20a and the drain of n-channel MOSFET 21 and the MOSFET 29 has its source-drain path connected between the power line 20a and the drain of n-channel MOSFET 24.

The switching circuit, designated 40, comprises a pair of n-channel MOSFETs 401 and 402. The MOSFET 401 of the pair has its gate coupled through a diode 403 to the drain of the other MOSFET 402 of the pair and has its source coupled to the low voltage power line 20b through a diode 404 and its drain coupled through pull-up resistors R5 and R6 to the power line 20a. MOSFET 402 has its gate coupled through a diode 405 to the drain of the MOSFET 401 and has its source coupled to the low voltage power line 20b through a diode 406 and its drain coupled through pull-up resistors R8 and R9 to the power line 20a. MOSFET 28 has its gate coupled through a resistor R7 to a circuit node between the pull-up resistors R5 and R6 and MOSFET 29 has its gate coupled through a resistor R10 to a circuit node between the pull-up resistors R8 and R9. The gate electrodes of MOSFETs 21, 22, 24 and 25 are controlled by bias voltages supplied through buffers 407 from the CPU 102.

The operation of the control system of FIG. 3 will be described below with reference to FIGS. 4A and 4B.

Figure 4A:
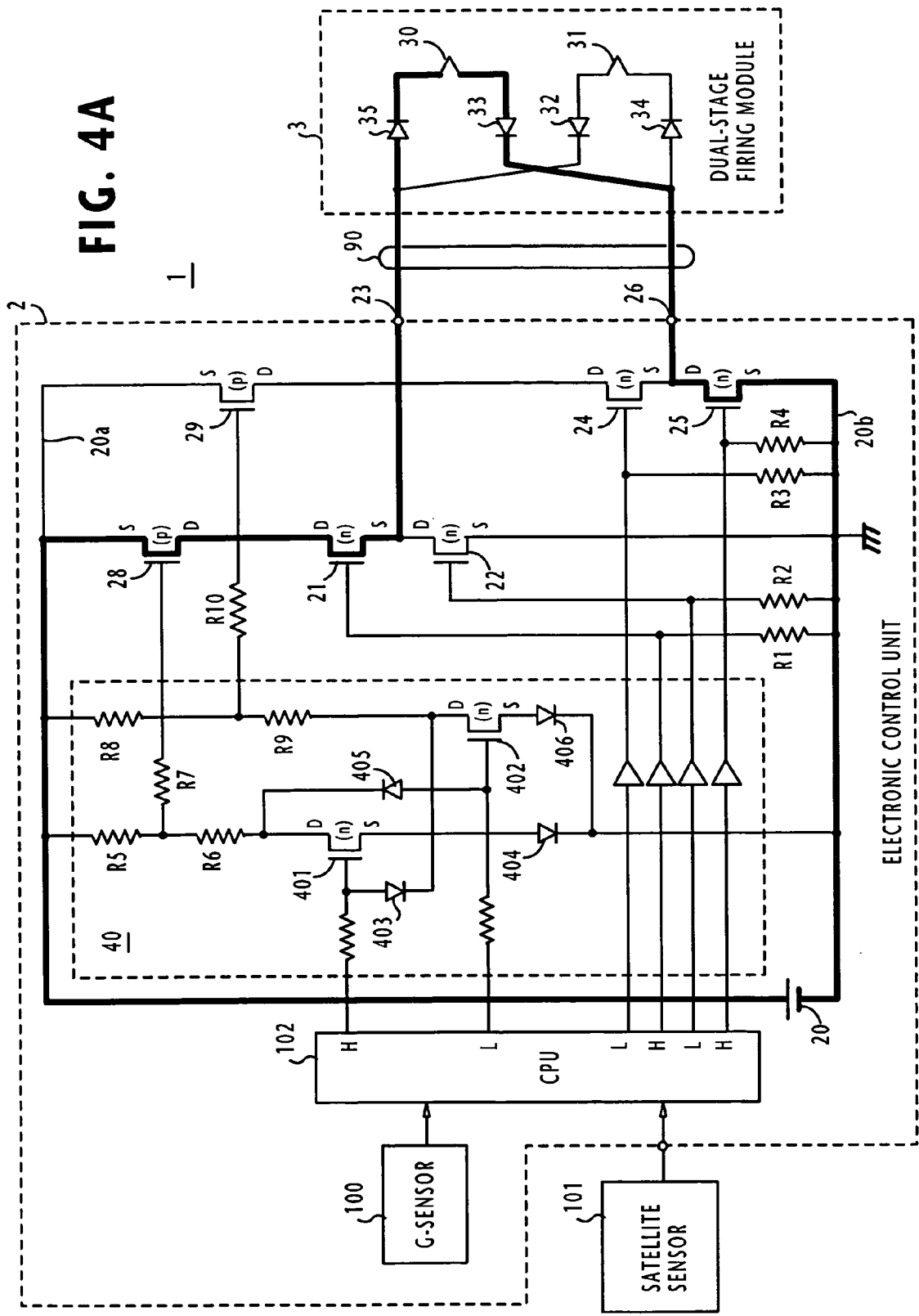
FIG. 4A is a block diagram of the second embodiment showing the flow of current from the ECU to the dual-stage firing module when the first-stage firing circuit is activated.
Figure 4B:
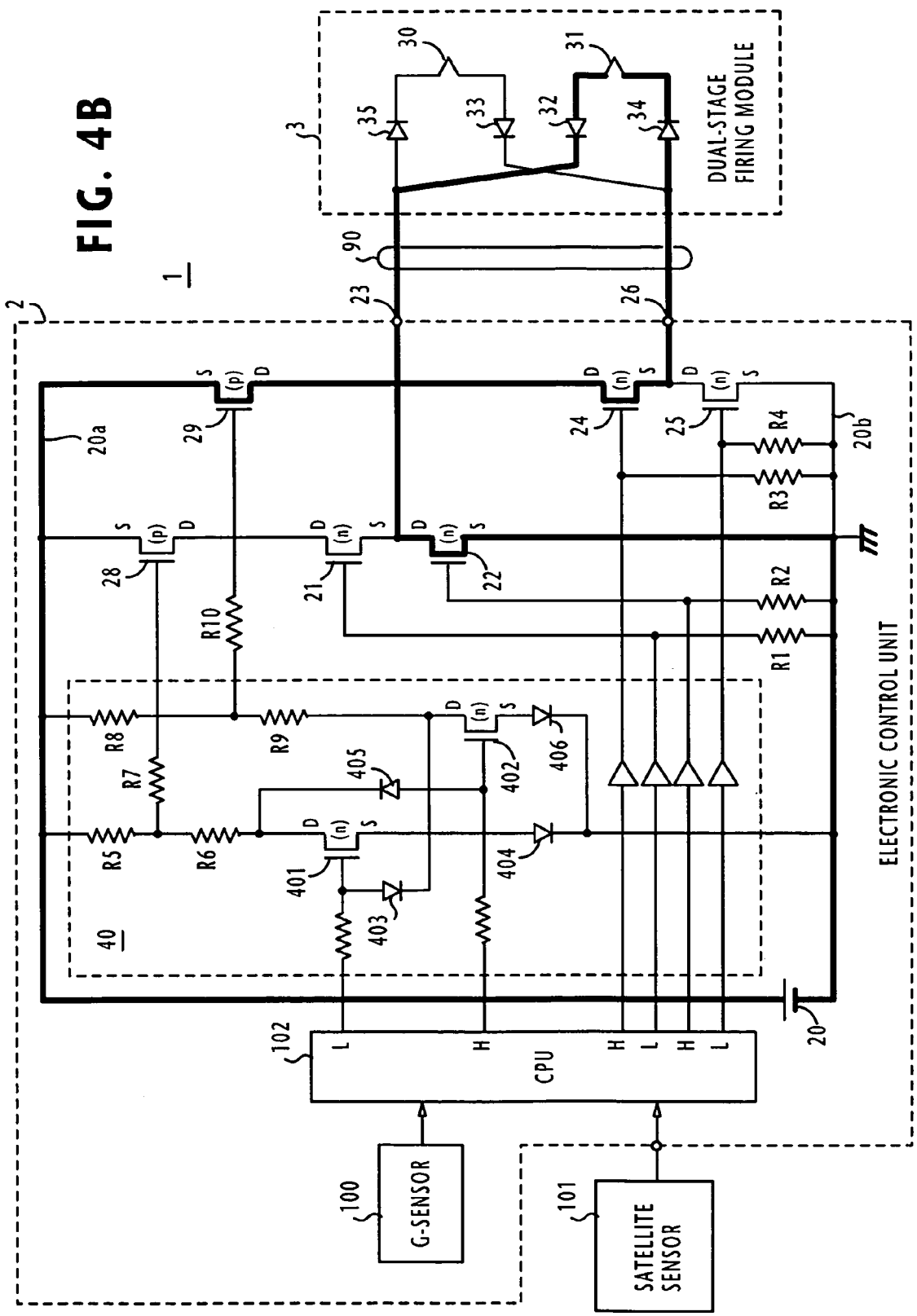
FIG. 4B is a block diagram of the second embodiment showing the flow of current when the second-stage firing circuit is activated.

In FIG. 4A, when the output of G-sensor 100 or satellite sensor 101 exceeds a critical level in response to the vehicle body being impacted, the CPU 102 drives the MOSFET 401 into an ON state with a high bias voltage (H) and drives the MOSFET 402 into an OFF state with a low voltage (L). Therefore, the MOSFET 28 is turned ON and the MOSFET 29 is turned OFF. At the same time, the CPU 102 drives both MOSFETs 21 and 25 into ON state and drives the MOSFETs 22 and 24 into OFF state. As a result, a high power voltage appears at the output terminal 23 with respect to the output terminal 26, causing a forward current to flow through the squib 30 as indicated by a thick line. Squib 30 is thus fired to operate the inflator.

At a specified interval following the firing of squib 30 (FIG. 4B), the CPU 102 drives the MOSFET 402 into an ON state and drives the MOSFET 401 into an OFF state. Therefore, the MOSFET 29 is turned ON and the MOSFET 28 is turned OFF. At the same time, the CPU 102 drives both MOSFETs 22 and 24 into an ON state and drives the MOSFETs 21 and 25 into an OFF state. As a result, a high power voltage appears at the output terminal 26 with respect to the output terminal 23, causing a reverse current to flow through the squib 31 as indicated by a thick line. Squib 31 is thus fired to further operate the inflator.

Figure 5:
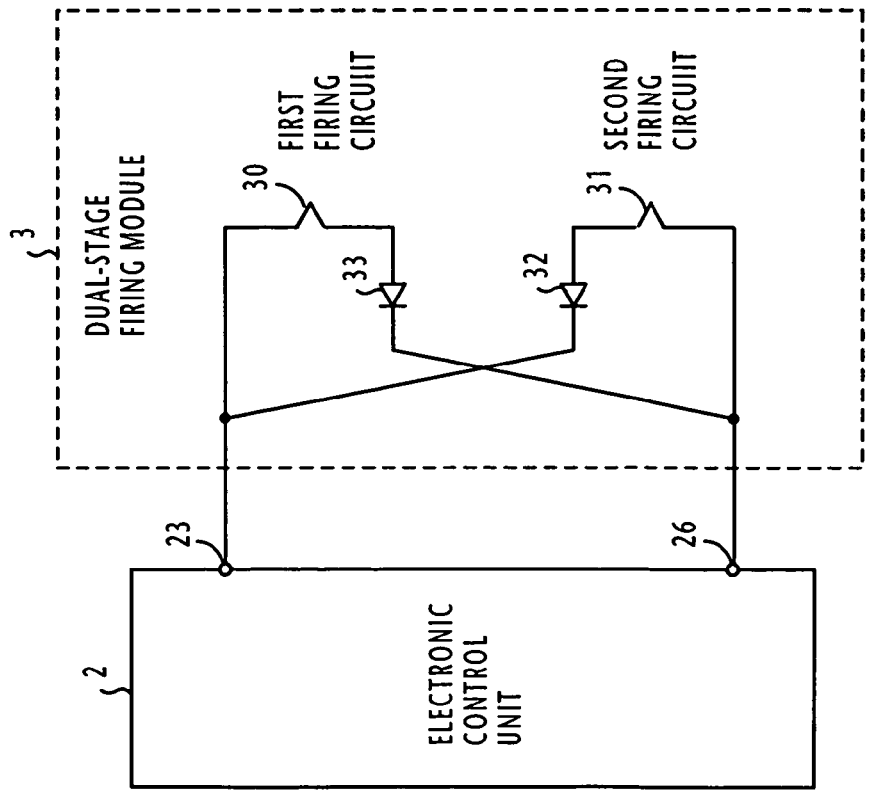
FIG. 5 is a simplified block diagram illustrating a modified form of the dual-stage firing module.

The following is a description of a number of variants of the dual-stage firing module 3. In the previous embodiments, two diodes of low breakdown voltage are used in each firing circuit. However, the use of only one diode for each firing circuit is advantageous because it reduces the voltage drop and hence the measurement error when the circuit is diagnosed and reduces the manufacturing cost of the circuit as well. As shown in FIG. 5, the diodes 34 and 35 of the previous embodiments are removed, leaving the diodes 33 in the first firing circuit and the diode 32 in the second firing circuit.

Figure 6:
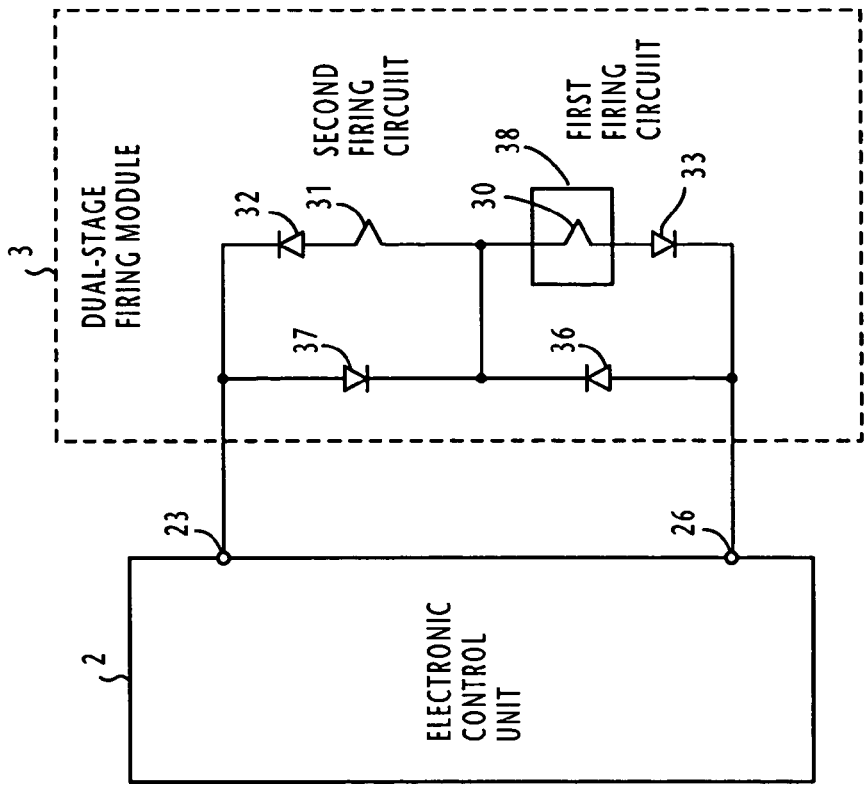
FIG. 6 is a simplified block diagram illustrating a further modification of the dual-stage firing module.

A further modification of the dual-stage firing module 3 is shown in FIG. 6. In this modification, diodes 36 and 37 are connected in opposite senses to each other in series across the output terminals 23 and 26 of the ECU 2. The first firing circuit is comprised of a series circuit of the squib 30 and the diodes 33 and 37, and the second firing circuit is comprised of a series circuit of the squib 31 and the diodes 32 and 36. These series circuits are connected across the output terminals 23 and 26. The circuit node between the squibs 30 and 31 is connected to the circuit node between the diodes 36 and 37. Squib 30 is sealed in a glass tube 38.

When the output terminal 23 is initially driven to a high voltage level, a forward current flows through the diode 37 and through the squid 30 and diode 33 back to the output terminal 26, causing the squib 30 to fire. Squib 30 may be broken into pieces. The glass tube 38 serves the purpose of preventing the broken pieces of the squib 30 from contacting the vehicle body. When the output terminal 26 is subsequently driven to a high voltage level, a reverse current flows through the diode 36 and through the squid 31 and diode 32 back to the output terminal 23, causing the squib 31 to fire. Since the initially fired squib 30 is sealed in the glass tube 38, no short circuit path exists between the high voltage output terminal 26 and the vehicle body when the squib 31 is subsequently fired, thus preventing the occurrence of a dangerous spark current.

Dual-stage firing module 3 can be separated into a driver-side firing module and a passenger-side firing module of a dual-airbag system.

Figure 7:
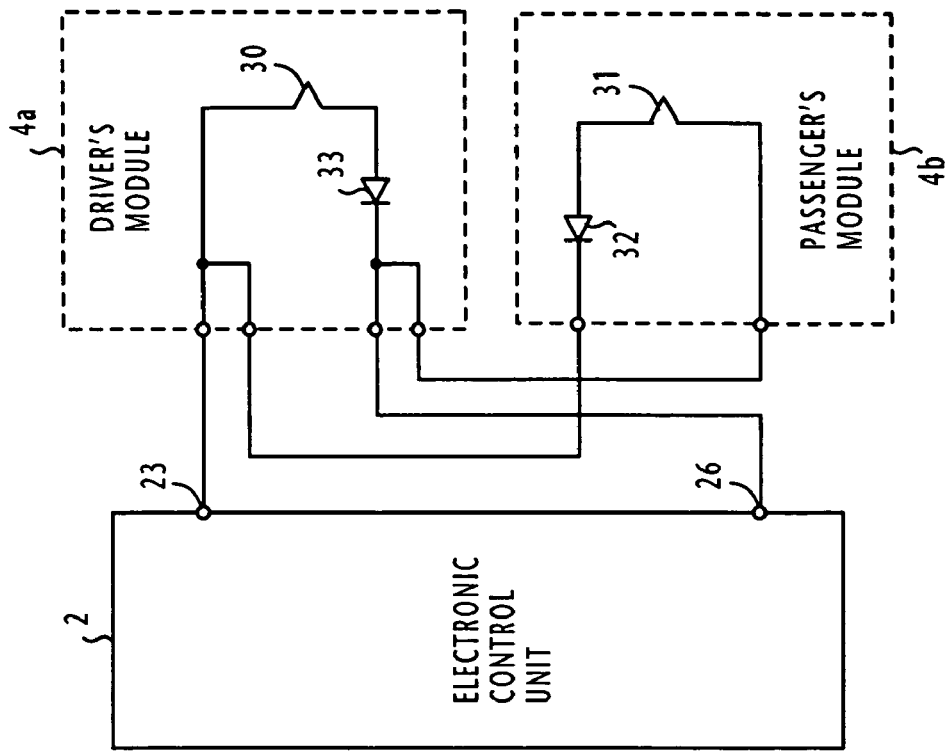
FIG. 7 is a simplified block diagram illustrating a still further modification of the dual-stage firing system implemented in a driver-side module and a passenger-side modules connected in a series circuit to the ECU.

A series configuration of separate modules is shown in FIG. 7. As illustrated, the driver-side firing module 4a comprises a series circuit of the squib 30, which is sealed in the glass tube 38, and the diode 33. This series circuit is anti-parallel connected with the diode 36. The passenger-side firing module 4b comprises a series circuit of the squib 31 and the diode 32, and this series circuit is anti-parallel connected with the diode 37. Diode 37 constitutes the first firing circuit with the diode 33 and squib 30 and the diode 36 constitutes the second firing circuit with the diode 32 and squib 31.

Diode 37 of the passenger-side firing module 4b and the diode 26 of the driver-side firing module 4a are connected in series in opposite senses to each other between the output terminals 23 and 26. When the output terminal 23 of the ECU 2 is initially driven to a high voltage level, the diodes 37 and 33 are forward-biased, causing a forward current to flow through the squib 30. When the output terminal 26 is subsequently driven to a high voltage level, the diodes 36 and 32 are forward-biased, causing a reverse current to flow through the squib 31. In a manner similar to FIG. 6, since the initially fired squib 30 is sealed in the glass tube 38, no short circuit path exists between the high voltage output terminal 26 and the vehicle body when the squib 31 is subsequently fired.

Figure 8:
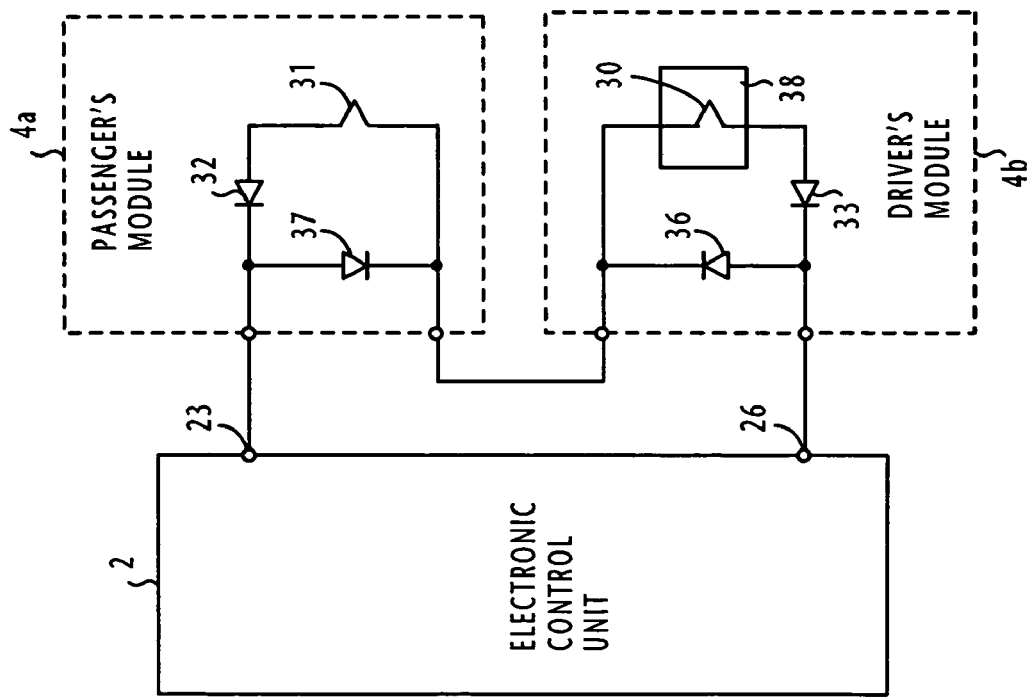
FIG. 8 is a simplified block diagram illustrating a still further modification of the dual-stage firing system implemented in a driver-side module and a passenger-side module connected in a parallel circuit to the ECU.
Figure 9:
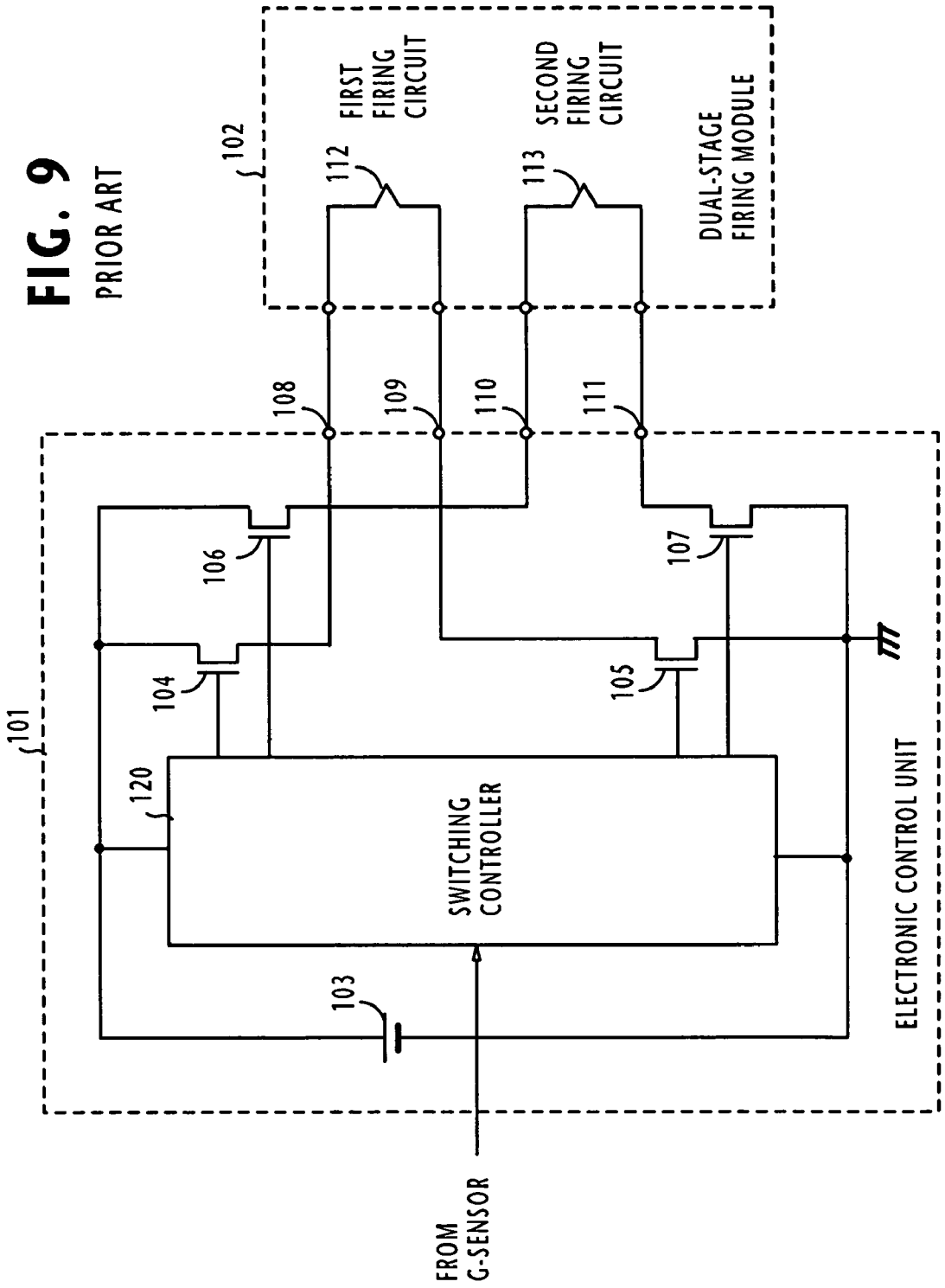
FIG. 9 is a simplified block diagram of a prior art control system for a dual-stage occupant restraint system.

A parallel configuration of separate modules is shown in FIG. 8. As illustrated, the driver-side firing module 4a comprises a series circuit of the squib 30 and the diode 33 which are connected across the output terminals 23 and 26. Passenger-side firing module 4b comprises the squib 31 and the diode 32 that are connected across the output terminals 23 and 26. These modules operate in exactly the same way as the dual-stage firing module 3 of FIG. 5.

While mention has been made of various forms of the present invention, modifications and alterations are possible without departing from the scope of the present invention. For example, the squib may be replaced with any firing element including a diode of the type that generates heat when it is forward-biased, and the switching elements may be implemented with bipolar transistors.

What is claimed is:

1. An electronic control unit for controlling a dual-stage firing system of a vehicle occupant restraint system, comprising:
    first and second output terminals adapted for connection to said dual-stage firing system; and
    a current supply circuit for initially supplying a forward current to a first stage of said dual-stage firing system through said output terminals when an impact is received, and subsequently supplying a reverse current to a second stage of said dual-stage fixing system through said output terminals in a direction opposite to said forward current
    wherein said current supply circuit comprises:
    a first series circuit of first and second switching elements connected between high and low voltage power lines to form a first circuit node between said first and second switching elements, said first circuit node being connected to said first output terminal;
    a second series circuit of third and fourth switching elements connected between said high and low voltage power lines in parallel with the first series circuit to form a second circuit node between said third and fourth switching elements, said second circuit node being connected to said second output terminal; and
    control circuitry for exclusively activating said first and fourth switching elements in response to said impact, for generating a forward voltage across said output terminals, and subsequently exclusively activating said third and second switching elements for generating a reverse voltage across said output terminals in a direction opposite to said forward voltage.

2. The electronic control unit of claim 1, wherein said first and second switching elements respectively comprise first and second transistors and said third and fourth switching elements respectively comprise third and fourth transistors, and said control circuitry, in response to said impact, turns said first and fourth transistors to an ON state and turns said second and third transistors to an OFF state, and subsequently turns said first and fourth transistors to an OFF state and turns said second and third transistors to an ON state.

3. The electronic control unit of claim 1, wherein said first and second switching elements respectively comprise first and second transistors and said third and fourth switching elements respectively comprise third and fourth transistors, further comprising:
    a fifth transistor connected in series with said first and second transistors; and
    a sixth transistor connected in series with said third and fourth transistors,
    wherein said control circuitry, in response to said impact, turns said first, fourth and fifth transistors to an ON state and turns said second, third and sixth transistors to an OFF stat, and subsequently turns said first, fourth and fifth transistors to an OFF state and turns said second, third and sixth transistors to an ON state.

4. A dual-stage firing system for a vehicle occupant restraint system, comprising:
    first and second output terminals; current supply circuitry for supplying a forward current from a DC voltage source in a direction from said first output terminal toward said second output terminal in response to an impact, and subsequently supplying a reverse current from said voltage source in a direction from said second output terminal toward said first output terminal;
    a first firing circuit including a first firing element connected across said first and second output terminals for activating the first firing element in response to said forward current; and
    a second firing circuit including a second firing element connected across said first and second output terminals for activating said second firing element in response to said reverse current.

5. The dual-stage firing system of claim 4, wherein said current supply circuit comprises:
    a first series circuit of first and second switching elements connected between high and low voltage power lines to form a first circuit node between said first and second switching elements, said first circuit node being connected to said first output terminal;
    a second series circuit of third and fourth switching elements connected between said high and low voltage power lines in parallel with the first series circuit to form a second circuit node between said third and fourth switching elements, said second circuit node being connected to said second output terminal; and
    control circuitry for exclusively activating said first and fourth switching elements in response to said impact for generating a forward voltage across said output terminals, and subsequently exclusively activating said third and second switching elements for generating a reverse voltage across said output terminals in a direction opposite to said forward voltage.

6. The dual-stage firing system of claim 5, wherein
    said first and second switching elements respectively comprise first and second transistors and said third and fourth switching elements respectively comprise third and fourth transistors, and said control circuitry, in response to said impact, turns said first and fourth transistors to an ON state and turns said second and third transistors to an OFF state, and subsequently turns said first and fourth transistors to an OFF state and turns said second and third transistors to an ON state.

7. The dual-stage firing system of claim 5, wherein said first and second switching elements respectively comprise first and second transistors and said third and fourth switching elements respectively comprise third and fourth transistors, further comprising:
- a fifth transistor connected in series with said first and second transistors; and
- a sixth transistor connected in series with said third and fourth transistors,
- wherein said control circuitry, in response to said impact, turns said first, fourth and fifth transistors to an ON state and turns said second, third and sixth transistors to an OFF state, and subsequently turns said first, fourth and fifth transistors to an OFF state and turns said second, third and sixth transistors to an ON state.

8. The dual stage firing system of claim 4, wherein said first firing circuit comprises a series circuit of first and second diodes connected in equal senses to each other across said first and second output terminals and said second firing circuit comprises a series circuit of third and fourth diodes connected in equal senses to each other and in opposite senses to said first and second diodes across said first and second output terminals, said first firing element being connected between said first and second diodes and said second firing element being connected between said third and fourth diodes.

9. The dual stage firing system of claim 7, wherein said second firing element is sealed within a protective envelope.

10. The dual stage firing system of claim 4, wherein said first firing circuit comprises a first diode connected in series with said first firing element across said first and second output terminals and said second firing circuit comprises a second diode connected in series with said second firing element in a sense opposite to said first diode across said first and second output terminals, said first diode being connected in such a position with respect to said first firing element that, when said second firing element is fired in response to a high voltage, the first diode prevents the high voltage from being applied to the previously fired first firing element.

11. The dual stage firing system of claim 4, wherein each of said first and second firing elements comprises a diode.

12. The dual stage firing system of claim 8, wherein each of said first, second, third and fourth diodes is a Schottky diode.

13. The dual stage firing system of claim 10, wherein each of said first and second diodes is a Schottky diode.

14. The dual stage firing system of claim 8, wherein said second and third diodes and said first firing element are provided in a first module, and said first and fourth diodes and said second firing element are provided in a second module, said third diode of the first module being connected to the first diode of said second module in opposite senses to each other across said first and second output terminals.

15. The dual stage firing system of claim 14, wherein said first firing element is sealed in a protective envelope.

16. The dual stage firing system of claim 4, wherein
said first firing circuit comprises a first diode connected in series with said first firing element across said first and second output terminals and said second firing circuit comprises a second diode connected in series with said second firing element in a sense opposite to said first diode across said first and second output terminals,
said first diode and said first firing element are provided in a first module, and said second diode and said second firing element are provided in a second module.

17. The dual stage firing system of claim 4, wherein said first and second firing circuits are housed in a common module for deploying an airbag in successive stages.

18. The dual stage firing system of claim 4, wherein said first and second firing circuits are housed in respective modules for deploying airbags in successive stages.

19. The dual-stage firing system of claim 4, wherein the first firing circuit includes a diode that allows the forward current to flow in the direction from the first output terminal toward the second output terminal, and the second firing circuit includes a diode that allows the reverse current to flow in the direction from the second output terminal toward the first output terminal.

20. The dual-stage firing system of claim 19, wherein the diode of the first firing circuit is one of two diodes between which the first firing element is ranged electrically in series, and the diode of the second firing circuit is one of two diodes between which the second firing element is ranged electrically in series.

\* \* \* \* \*